May 26, 1925.

A. FALK

TOW ROD

Filed March 8, 1924

1,539,474

Inventor

ALBIN FALK.

By Geo Stevens

Attorney

Patented May 26, 1925.

1,539,474

UNITED STATES PATENT OFFICE.

ALBIN FALK, OF DULUTH, MINNESOTA.

TOW ROD.

Application filed March 8, 1924. Serial No. 697,722.

*To all whom it may concern:*

Be it known that I, ALBIN FALK, a citizen of the United States, residing at Duluth, in the county of St. Louis and State of Minnesota, have invented certain new and useful Improvements in Tow Rods, of which the following is a specification, reference being had therein to the accompanying drawing.

This invention relates to tow rods and has special reference to such a device for use in towing one automobile behind another.

The principal object of the invention is to provide a more practical and convenient ly manipulated device of this character than heretofore known.

Another object is to provide such a device which is automatically centered transverse the axle of the towed vehicle when applied thereto, and one which is equally applicable to a vehicle upon which the steering rod may be either in front of or behind the front axle.

Other objects and advantages of the invention will appear in the further description thereof.

Referring now to the accompanying drawing forming part of this application and in which like reference characters indicate like parts:

Figure 1:
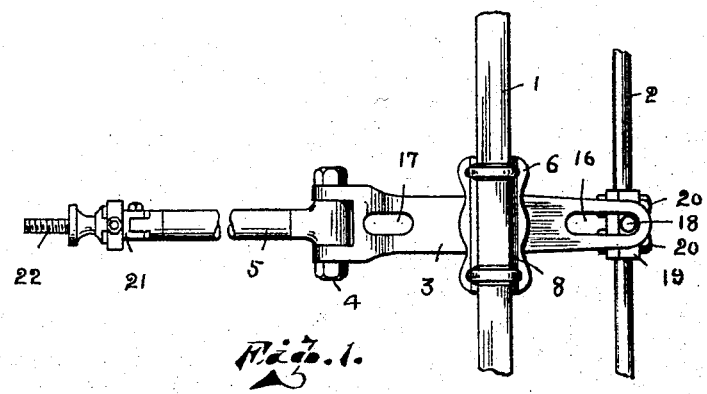
Figure 1 is a top plan view of one of the improved rods, the central portion being broken away.
Figure 2:
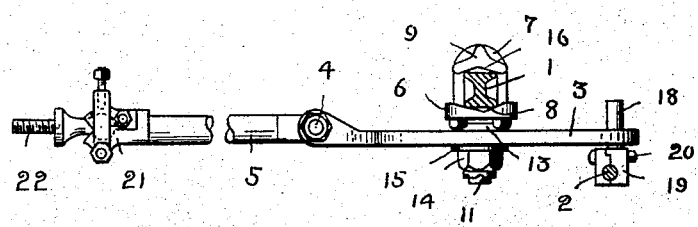
Figure 2 is a side elevation of same.
Figure 3:
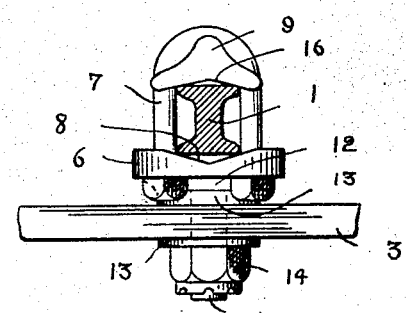
Figure 3 is an enlarged side elevation of the attachment to the axle of the towed vehicle.

1 represents the axle of the vehicle being towed and 2 the steering rod of same, which, in the instance illustrated, is in the rear of the axle. The fork or pivotal plate of the attachment is represented at 3 and is bifurcated at its forward end, pivotally carrying upon a suitable through bolt 4 the forwardly extending rod 5 which may be either tubular or solid as preferred. This fork is pivotally suspended directly beneath the center of the axle 1 by means of the channeled plate or saddle 6 which is suspended longitudinally of and beneath the axle 1 by the inverted U-bolts 7, there being one of such adjacent each end of the saddle.

The U-bolts 7 are sufficiently wide to accommodate any ordinary axle found on an automobile, such axles being usually of I-beam construction, or at least generally rectangular in cross-section, the ends of the U-bolts extending through the saddle and the latter impinging tightly against the under side of the axle by being drawn up tightly. A longitudinal V-shaped channel 8 is formed the entire length of the saddle 6 so that when drawn tightly against the under side of the axle it will be properly centered thereunder, and I prefer to provide the arch of the U-bolts with saddles or wearing plates indicated at 9, which are also V-shaped as at 10 upon their under sides thus having a tendency to automatically center themselves over the axle.

The king bolt or center pin 11 is formed integral with, or at least rigidly attached to, the saddle 6, having preferably a hub like portion 12 surrounding same adjacent the saddle, and beneath which and the fork 3 may be employed any desired form of washer, such as indicated at 13. The king bolt 11 extends through the fork 3, the latter being pivotally supported thereupon by means of a suitable nut 14 and washer 15, and in common practice the fork and saddle are reasonably tightly united so as to prevent objectionable slack therebetween.

An elongated slot 16 is formed in the free end of the fork 3, and a similar slot 17 is formed adjacent the opposite end of same, these slots being for the reception of the projecting pin 18 of the clamp 19 which is attached to the steering rod 2 of the automobile being towed. The clamp 19 is preferably made of two separable halves united by two small bolts 20 and are rectangular in shape externally and formed with suitable opposed grooves to surround the rod 2 and clamp tightly thereagainst by the bolts 20. It is apparent that this clamp may be mounted upon the steering rod 2 with the pin projecting either upwardly or downwardly as the individual circumstances may require, that is in respect to the vertical position of the steering rod in relation to the axle 1.

In the event of the steering rod being forward of the axle 1, the pin of the clamp 19 would be engaged within the slot 17 instead of the slot 16, thus forming means whereby when the saddle is turned either one way or the other horizontally upon its pivotal attachment under the axle it will correspondingly move the steering rod and thus cause the towed vehicle to follow the towing vehicle.

As a means of attaching the head end of the rod 5 to the towing vehicle I provide an adjustable ball and socket joint indicated at 21, the shank 22 of the joint being readily attached to any portion of the vehicle desired, it being screw threaded and provided with a suitable nut for the purpose.

From the foregoing it is evident that I have devised an exceedingly simple, flexible, and practical towing rod for vehicles.

Having thus described my invention, what I claim and desire to secure by Letters Patent, is:

The combination with a vehicle towing rod including a member disposed transverse the forward axle of the vehicle being towed and engageable with the steering rod of said vehicle, of means for pivotally supporting said member directly beneath the axle of the vehicle, said means comprising a longitudinal central groove for engagement with the underside of the axle of the vehicle, and means at either end of the member for securely attaching it thereto.

In testimony whereof I hereunto affix my signature in the presence of two witnesses.

ALBIN FALK.

Witnesses:
S. C. BRONSON,
S. GEO. STEVENS.